United States Patent Office 3,406,662
Patented Oct. 22, 1968

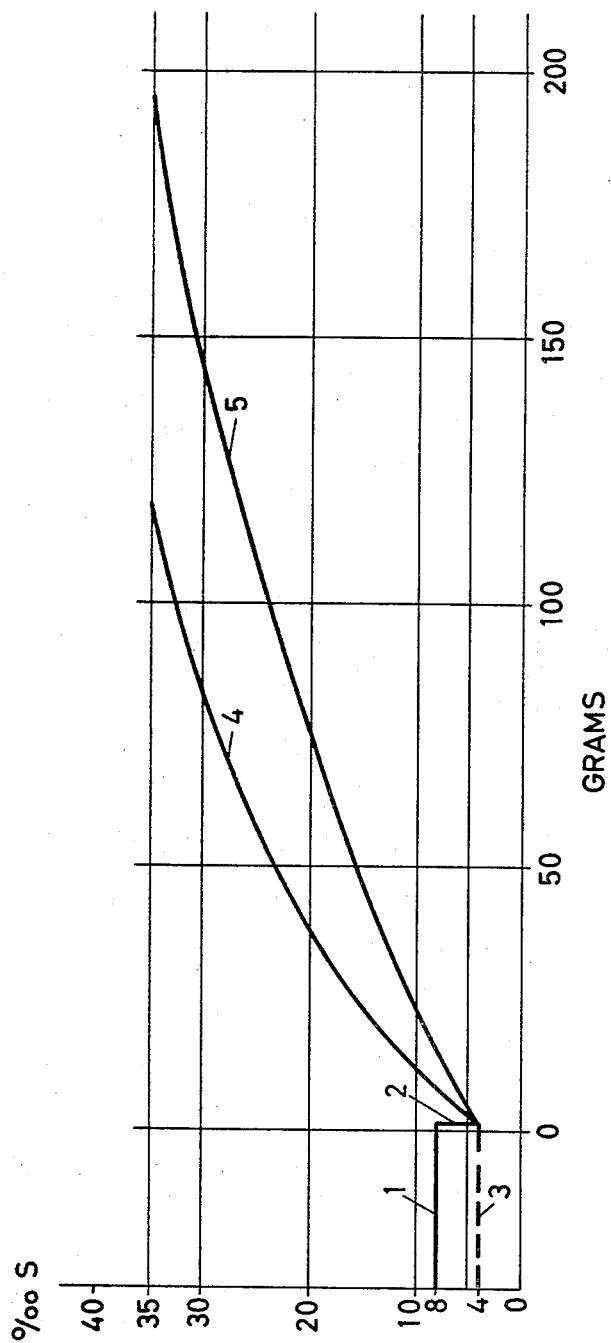

3,406,662
METHOD FOR BREEDING FISH, SUCH AS
SALMON OR SEA TROUT
Karstein Oddmund Vik and Olav Birger Vik, Sykkylven,
Norway, assignors to Nor Laks, O.C. Vik & K.O. Vik,
Sykkylven, Norway
Filed Aug. 19, 1966, Ser. No. 573,639
Claims priority, application Norway, Aug. 20, 1965,
159,416
1 Claim. (Cl. 119—3)

The present invention relates to a new method for breeding fish, such as salmon and trout, in captivity.

In recent years new methods for breeding fish, such as salmon and sea trout, have been developed and by which the water consists of a mixture of fresh water and sea water, so-called brackish water, and also breeding in pure sea water. Sea water, or rather the nutrition minerals and salts therein, has proved to enhance the growth of the fish simultaneously as the occurrence of various diseases are radically reduced. The proportion of sea water in the mixture must, while the fish is small, be relatively low, but the fish can while it is growing be accustomed to live in steadily stronger sea water mixture.

It has hitherto been assumed, however, that the roe and the fish on the fry stage must be supplied exclusively with pure fresh water. This assumption has its natural basis in the fact that salmon fishes, such as Atlantic salmon and sea trout, always is seeking fresh water, i.e., the fish is wandering far up the rivers in order to spawn. It is further well known that the fry fish and the small fish, the so-called fingerlings, live in fresh water until the fish is big enough to leave the fresh water, i.e., it is leaving the river and swimming out in the ocean, where it continues its life until it returns to the river to spawn.

The inventors have during the past years carried out series of experiments with the spawned roe and also with hatched fry and small fish and these experiments confirm to a large degree the accepted doctrine that the roe and the fry fish cannot live in sea water or in a mixture of sea water and fresh water. The inventors have thus verified that if the spawned roe during the hatching period is placed in streaming water the salinity of which surpasses about 4 pro mille, the hatched fry will actually die very rapidly. The inventors have nevertheless now made the important discovery that if only certain special measures are being taken, one can with important advantages also during the hatching period and during the fry stage employ a much higher proportion of sea water than corresponding to the before mentioned 4 pro mille salinity, and having in result that the so-called hatching percentage (the percentage of the roe which is transformed to fry) as well as the growth per time unit are increased substantially.

The inventors' experiences and discoveries may briefly be summarized such that the roe during the hatching period may be supplied and live in flowing or streaming water the salinity of which is maintained at about 8 pro mille, but then at the end of the hatching period, the salinity of the water is immediately reduced to about 4 pro mille, whereafter the hatched roe, i.e. the fry should be subjected to a gradual adaptation of sea water and very soon to a progressive adaptation to sea water having in effect that the fish already at a weight of about 120–200 grams can live in pure sea water, i.e., in water having a salinity of about 35 pro mille.

When the above mentioned measures are being taken a much smaller death rate will occur during the roe stage, the hatching time period is reduced and subsequent to the hatching one can carry out a progressive sea water adaptation having in result that the fish is reaching the above mentioned weight of about 120–200 grams by the end of a time period which is much shorter than the time period which hitherto has been assumed possible, and furthermore, one can use a smaller feed quantity than hitherto has been assumed necessary in order to reach this weight, a fact which partly can be credited to the extra supply of nutrition salts and minerals which the roe, the fry and the fish have received through the sea water.

A presupposition that the method can be carried out with what one could call optimum results, is that certain other factors also are kept close to the ideal, the most important of which factors is the acidity of the water, i.e. the pH-value, and furthermore, the water temperature. During the hatching the ideal temperature will be at about 10° C. simultaneously as the water should be as neutral as possible, i.e., keeping the pH-value at about 7.0. After the hatching it will enhance the growth to use warmer water, for instance at 12° C. If the water is colder than ideal temperature, then the sea water adaptation must go slower, a circumstance which again will decrease the growth. The ideal water is as mentioned neutral, i.e., it keeps a pH-value of 7.0. Very frequently the available fresh water will, however, have a certain acidity, for instance having a pH-value of about 6.2. In such a case the sea water, which normally has an alkali reserve, will also serve to neutralize the fresh water, so that the mixture will be substantially neutral. If the fresh water for instance has an acidity expressed by a pH-value of about 6.0–6.2, the water mixtures can to a certain degree be neutralized by supplying sea water in such quantity that the salinity will be about 8 pro mille. When the fresh water thus is acidic, the sea water will serve a double purpose, namely to supply the fish with nutrition salts as well as to neutralize the fresh water. Furthermore, the sea water will, particularily during the winter time, result in that the water mixture temperature will be increased, a condition which also is to advantage.

The method in accordance with the invention shall in the following be illustrated in connection with the accompanying drawing, which is showing a diagram illustrating the salinity in relation to the size of the fish, and thus the time, the salinity given in pro mille along the ordinate, while the fish weight is given along the abscissa in grams.

As it appears from the initially straight part 1 of the curve, the salinity of the water during the hatching period is kept at about 8 pro mille until the roe begins to hatch. Then the salinity is immediately reduced to about 4 pro mille as shown with the vertical curve portion 2. The duration of the hatching period will vary, among other factors depending upon the water temperature. As previously mentioned a salinity content of about 8 pro mille will mean that the method is carried out with optimum results. If one, during the hatching period, for instance only employs water containing about 4 pro mille salinity, as given with the dotted line 3, reduction of the salinity of the water when the hatching takes place will not be necessary, but the hatching percentage will thus be lower simultaneously and the risk for diseases will increase.

When the roe has hatched one initiates immediately a progressive adaptation to sea water and this adaptation should take place so that it harmonizes with the weight increase of the fish. The curve portion 4 illustrates the optimum accomplishment of the method, and this means that the fish already at a weight of about 120 grams can live in pure sea water.

Such an optimum adaptation program can, however, in standard breeding plants involve certain risk, because of sudden temperature changes which of course can occur. The inventors have found that the sea water adaptation should be carried out carefully and the more carefully the lower the water temperature is. An undesired change in the water temperature during the progressive sea water adaptation can in the worst case involve mass death among the fish. The curve 5 illustrates a secure adaptation curve whereby the fish at a weight of about 200 grams can live in pure sea water.

By correct use of the breeding method in accordance with the invention one can almost double the growth rate and thereby the weight quantity of the fish production at a certain plant size and this doubling can be carried through only with about 50% increase of the feed quantity.

We claim:
1. Method for treatment, hatching and breeding of fish whereby the spawned roe during the hatching period is in a streaming water environment, the hatched roe, i.e., the fry, during the subsequent breeding living in a mixture of fresh water and sea water, which comprises steps of placing the roe during the hatching period in streaming water consisting of a mixture of fresh water and sea water having a salinity of about 8 pro mille, and immediately reducing the salinity of the water when the hatching itself takes place to about 4 pro mille, and then subjecting the hatched fry to a progressive sea water environment by increasing the proportion of sea water to streaming water as a function of the weight increase of the fish.

References Cited
UNITED STATES PATENTS

| | | | |
|---|---|---|---|
| 2,944,513 | 7/1960 | Keely | 119—3 |
| 2,955,569 | 10/1960 | Dahlin | 119—3 |
| 3,025,831 | 3/1962 | Berardi | 119—2 |
| 3,029,784 | 4/1962 | Elbreder et al. | 119—2 |
| 3,110,285 | 11/1963 | Greenough | 119—3 |
| 3,139,402 | 6/1964 | Armbrust | 119—3 X |
| 3,158,135 | 11/1964 | Kimmerle | 119—3 |
| 3,166,043 | 1/1965 | Castillo | 119—3 |

OTHER REFERENCES

Exotic Aquarium Fishes, "Diseases" by Wm. T. Innes, 18th ed., 1955, p. 61.

ALDRICH F. MEDBERY, *Primary Examiner.*